United States Patent [19]
Inoue

[11] Patent Number: 5,966,175
[45] Date of Patent: Oct. 12, 1999

[54] BACK LIGHT DETECTING METHOD, BACK LIGHT DETECTING DEVICE AND IMAGE PICK-UP CAMERA

[75] Inventor: Koji Inoue, Kanagawa, Japan

[73] Assignee: Sony Corporation, Tokyo, Japan

[21] Appl. No.: 08/811,225

[22] Filed: Mar. 5, 1997

[30] Foreign Application Priority Data

Mar. 27, 1996 [JP] Japan .................................. 8-097576

[51] Int. Cl.⁶ ................................................ H04N 5/238
[52] U.S. Cl. .......................... 348/364; 348/363; 348/366
[58] Field of Search ...................... 348/362, 363, 348/364, 365, 366; 396/89, 96, 155; H04N 5/238

[56] References Cited

U.S. PATENT DOCUMENTS 5,065,248  11/1991  Homma .................... 348/364
5,486,861  1/1996  Miyamoto et al. ..................... 348/362

*Primary Examiner*—Tuan Ho
*Attorney, Agent, or Firm*—Frommer Lawrence & Haug, LLP; William S. Frommer

[57] ABSTRACT

A back light detecting method, a back light detecting device and an image pick-up camera for detecting a back light state in view of the pick-up state of a subject. Concerning a pixel other than the pixel within the brightness level between two slice levels given from the outside, its brightness level is integrated to distinguish a subject area $AR_M$ from a background area $AR_L$. A back light state BLS is estimated from the area $HIST_M$ and the brightness level $Y_M$ of the subject area $AR_M$. Thereby the back light state can be detected more correctly.

8 Claims, 11 Drawing Sheets

BACK LIGHT DETECTING METHOD, BACK LIGHT DETECTING DEVICE AND IMAGE PICK-UP CAMERA

BACKGROUND OF THE INVENTION

1. Field of the Invention

This invention relates to a back light detecting method, a back light detecting device and an image pick-up camera, in which a back light state is detected according to a subject image.

2. Description of the Related Art

Heretofore, in a video camera, a predetermined brightness is kept by taking feedback in which the brightness of a pick-up picture is detected and a diaphragm is adjusted so that a brightness level of this picture is kept in a predetermined reference level.

In such automatic exposure control, feedback is always effected so that the pick-up picture is to be a reference brightness level set previously. For example, in a picture with a back light in which there is the sun in a background of a subject, feedback in which the brightness level of the whole picture is controlled in low level owing to the sun having a remarkably high brightness level, thus the subject image become dark.

Therefore, in the conventional video camera, a back light state is detected and controlled so that the image becomes not dark more than need and the brightness of a subject image becomes in a medium level in the above state. In such conventional method, as a technique of detecting a back light state, it has been used that a picture is divided into a high brightness region and a low brightness region to detect being in back light when the difference of those brightness levels is large.

By the way, in case of detecting a back light state by using the above method, the back light state is detected only how a picture is divided into a high brightness region and a low brightness region in accordance with a fixed threshold value and those brightness levels are simply compared with each other. Thus more detailed gradation in the area detected having a low brightness and an area of each gradation have not been decision factors for a back light state.

Accordingly, if it is detected that both a small subject and a large background are in the range of low brightness level and the subject is brighter than the background for example, a back light correcting apparatus takes correction so that a brightness level of the background having a larger area and being dark becomes in suitable. As a result, there is a problem that the subject becomes in overexposure and brighter more than need.

SUMMARY OF THE INVENTION

In view of the foregoing, an object of this invention is to provide a back light detecting method, a back light detecting device and an image pick-up camera capable of detecting a back light state in view of a subject.

To solve the foregoing object and other objects, in this invention, an area of a medium brightness region between a first brightness level and a second brightness level and an average brightness level of the medium brightness region are detected, and a back light state is detected on the basis of the area of the medium brightness region and the average brightness level of the medium brightness region.

Further in this invention, it is detected that a back light state is strong as the area of the medium brightness region is larger and the brightness level of the medium brightness region is smaller.

Also in this invention, in a back light detecting device for controlling an exposure so that the brightness of a pick-up picture is to be in a reference level being an aim, detecting means for detecting an area of a medium brightness region between a first brightness level and a second brightness level and an average brightness level of the medium brightness region, and detecting means for detecting a back light state on the basis of the area of the medium brightness region and the average brightness level of the medium brightness region are comprised.

Moreover in this invention, in a pick-up camera for controlling an exposure so that the brightness of a pick-up picture is to be in a reference level being an aim, detecting means for detecting an area of a medium brightness region between a first brightness level and a second brightness level and an average brightness level of the medium brightness region, and detecting means for detecting a back light state on the basis of the area of the medium brightness region and the average brightness level of the medium brightness region are comprised.

In this invention, an area and a brightness level of a medium brightness region being a subject area is extracted by distinguishing from a low brightness region being a background area. Thereby, the state of back light state in view of only a shooting state of a subject in the whole picture can be detected.

The nature, principle and utility of the invention will become more apparent from the following detailed description when read in conjunction with the accompanying in which like parts are designated by like reference numerals or characters.

DETAILED DESCRIPTION OF THE EMBODIMENT

Preferred embodiment of this invention will be described with reference to the accompanying drawings:

An embodiment of this invention will be described in detail accompanying with the drawings.

In a back light detecting device according to this invention, slice integration is performed on brightness data in a digital signal process for a pick-up signal which is obtained via a solid imaging device (CCD).

Figure 1:
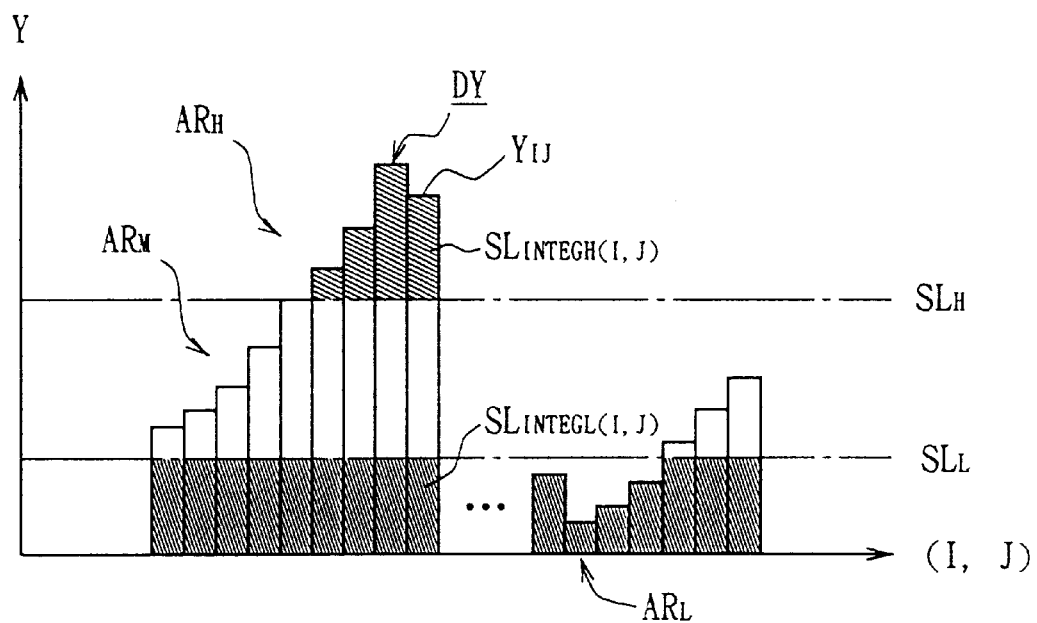
FIG. 1 is a graph explaining slice integration.

FIG. 1 shows Ith brightness data DY of a Jth horizontal scanning line (J line) in a pick-up picture. For example, the brightness data of a Jth pixel in the vertical direction and an Ith pixel in the horizontal direction is assumed as $Y_{IJ}$. In the case where slice integration of the brightness data $Y_{IJ}$ is performed, the data of a high brightness part which is larger than a slice high level $SL_H$ set previously is first integrated. This integrated data is assumed as slice high integrated data $SL_{INTEGH(I, J)}$. Assuming that the comparison result between the brightness data $Y_{IJ}$ and the slice high level $SL_H$ as $COMPH_{IJ}$, the slice high integrated data $SL_{INTEGH(I, J)}$ is represented by the following equation:

$$SL_{INTEGH(I, J)} = COMPH_{IJ} \times (Y_{IJ} - SL_H) \qquad (1)$$

However, when the relation between the brightness data $Y_{IJ}$ and the slice high level $SL_H$ is $Y_{IJ} \geq SL_H$, the comparison result $COMPH_{IJ}$ becomes 1. When $Y_{IJ} < SL_H$, it becomes 0.

Further, in the technique of slice integration, the data of a low brightness part which is smaller than a slice low level $SL_L$ set previously is integrated. This integrated data is assumed as slice low integrated data $SL_{INTEGL(I, J)}$. Assuming that the comparison result between the brightness data $Y_{IJ}$ and the slice low level $SL_L$ as $COMPL_{IJ}$, the slice low integrated data $SL_{INTEGL(I, J)}$ is represented by the following equation:

$$SL_{INTEGL(I, J)} = COMPL_{IJ} \times SL_L + (1 - COMPL_{IJ}) \times Y_{IJ} \qquad (2)$$

However, when the relation between the brightness data $Y_{IJ}$ and the slice low level $SL_L$ is $Y_{IJ} \geq SL_L$, the comparison result $COMPL_{IJ}$ becomes 1. When $Y_{IJ} < SL_L$, it becomes 0.

Thus calculated slice high integrated data $SL_{INTEGH(I, J)}$ and the slice low integrated data $SL_{INTEGL(I, J)}$ are added to each other as the following equation:

$$SL_{INTEG(I, J)} = SL_{INTEGH(I, J)} + SL_{INTEGL(I, J)} \qquad (3)$$

Figure 2:
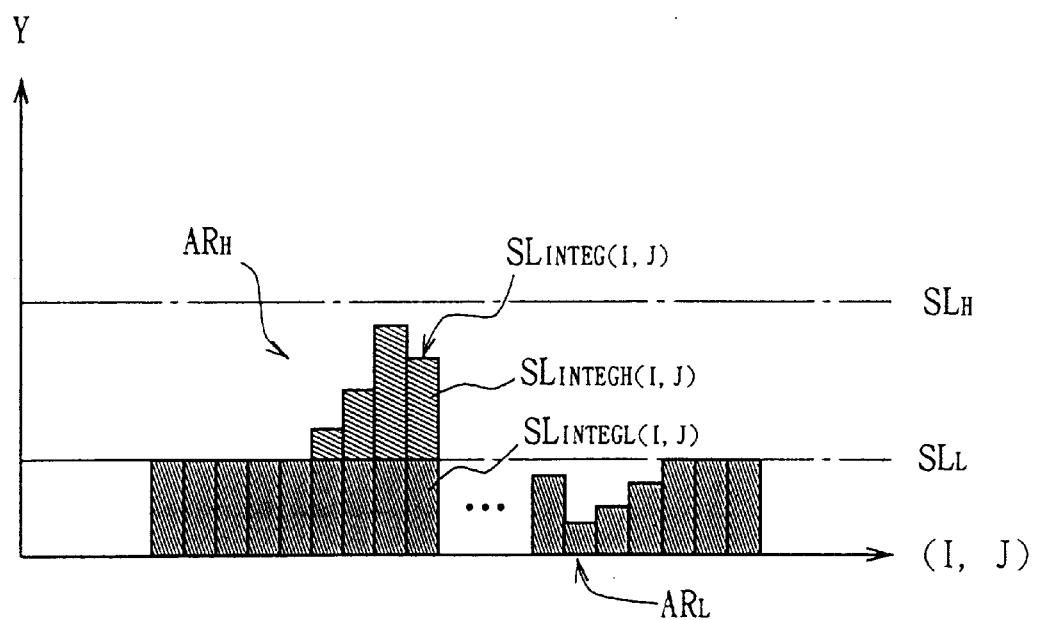
FIG. 2 is a graph explaining the slice integration.

As a result, the slice integrated data $SL_{INTEG(I, J)}$ of the first pixel in the horizontal direction can be obtained as shown in FIG. 2. This slice integrated data $SL_{INTEG(I, J)}$ is the data that the medium brightness data between the slice high level $SL_H$ and the slice low level $SL_L$ is extracted.

Thus calculated slice integrated data $SL_{INTEG(I, J)}$ of the J line in the vertical direction and the first pixel in the horizontal direction is added to all of the pixels of one picture as shown by the following equation:

$$SL_{INTEGALL} = \Sigma_{J=0, N} (\Sigma_{I=0, M} SL_{INTEG(I, J)}) \qquad (4)$$

As a result, the slice integrated data $SL_{INTEGALL}$ for one picture can be obtained. However, it is assumed that the number of lines in the vertical direction is "N" and the number of pixels in the horizontal direction is "M".

Thereby, of the brightness data DY for one picture, it is obtained that the data wherein the data having a larger brightness level than the slice high level SLH is integrated by the data having a smaller brightness level than the slice low level $SL_L$, that is, the slice integrated data $SL_{INTEGALL}$ in which the medium brightness data between the slice high level $SL_H$ and the slice low level $SL_L$ can be extracted.

Figure 3:
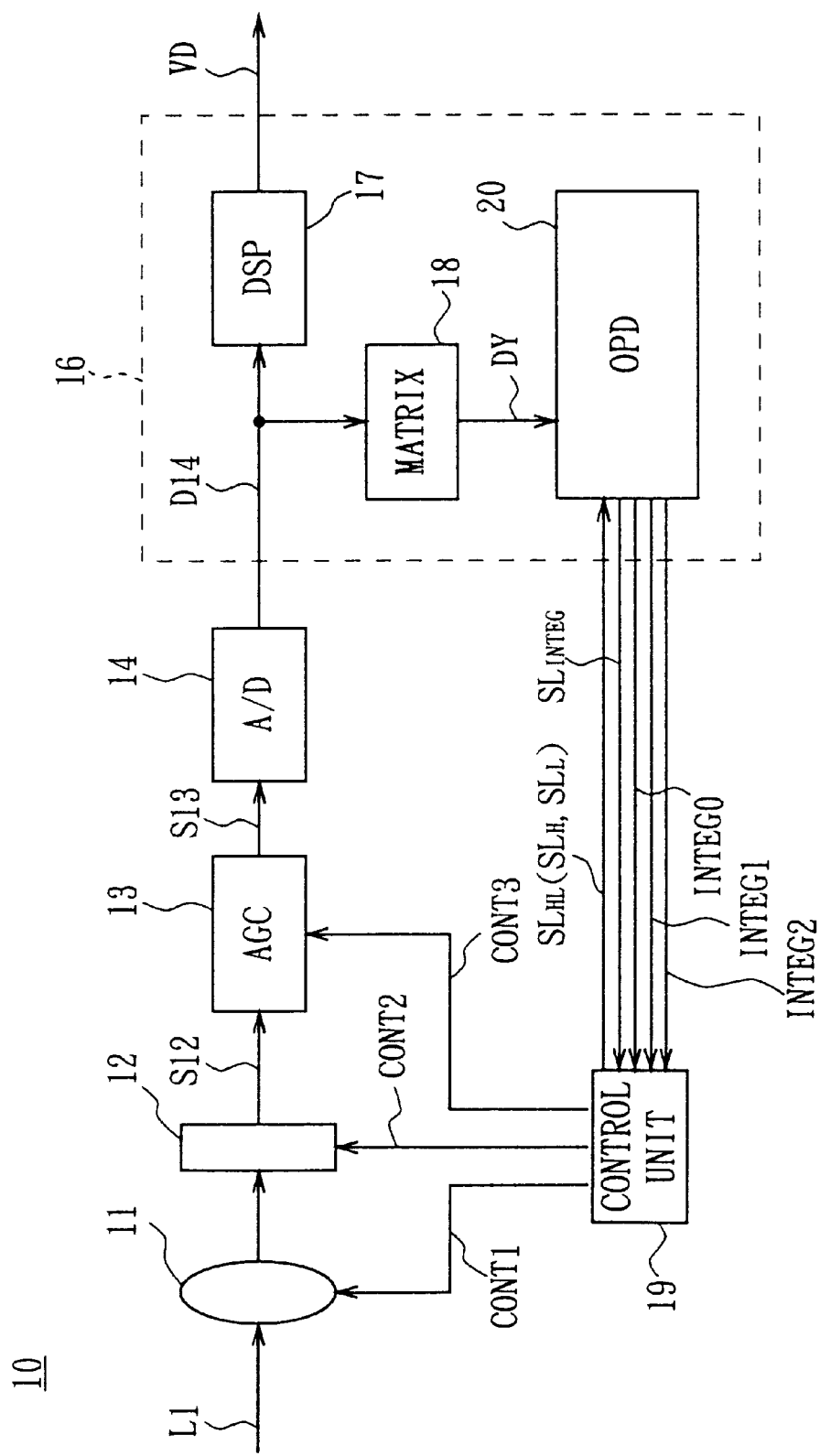
FIG. 3 is a block diagram showing an embodiment of video camera according to this invention.

Referring to FIG. 3, a reference numeral 10 generally shows a video camera as pick-up means, in which a pick-up light obtained via a pick-up lens is focused on the light receiving surface of a solid imaging device (CCD) 12 through a diaphragm 11. The diaphragm 11 limits the quantity of light of a pick-up light L1 by the quantity detected by a brightness control signal CONT1 from a control unit 19. The pick-up light L1 the quantity of light is thus controlled is converted from light into electricity in the solid imaging device 12. The solid imaging device 12 has a complementary color filter on the light receiving surface, and a pick-up signal obtained from each pixel is output at the timing of raster scanning.

Here, in the solid imaging device 12, an electric charge storing time in light-to-power converting is controlled by a brightness control signal CONT2 from the control unit 19, and a pick-up signal S12 of a signal level (brightness level) which is based on the electric charge storing time is obtained. The pick-up signal S12 obtained at the solid imaging device 12 is output to the following automatic gain control device (AGC) 13.

The automatic gain control device 13 amplifies the pick-up signal S12 at an amplitude ratio which is detected by a brightness control signal (gain control signal) CONT3 from the control unit 19 to obtain a pick-up signal S13, and outputs this to an analog-to-digital converting circuit (A/D) 14. In the above manner, the analog-to-digital converting circuit 14 converts the pick-up signal S13 which is adjusted by the diaphragm 11, solid imaging device 12 and automatic gain control device 13 so that the brightness of picture becomes a fixed reference value $AE_{REF}$, into a digital signal D14 and outputs this to a digital signal processing circuit (DSP) 17 and a matrix circuit 18 of a signal processing circuit 16. The digital signal processing circuit 17 performs such as gamma correction processing and synchronizing signal addition processing for the digital signal D14 to obtain a video signal VD.

On the other hand, the matrix circuit 18 extracts 9 [bit] of brightness data DY from the input digital signal D14 and outputs it to an optical detecting circuit (OPD) 20. The optical detecting circuit 20 calculates slice integrated data $SL_{INTEG}$ based on the slice high level $SL_H$ and the slice low level $SL_L$ input from the control unit 19 as the slice high/low level data $SL_{HL}$, and the brightness data DY input from the matrix circuit 18.

Figure 4:
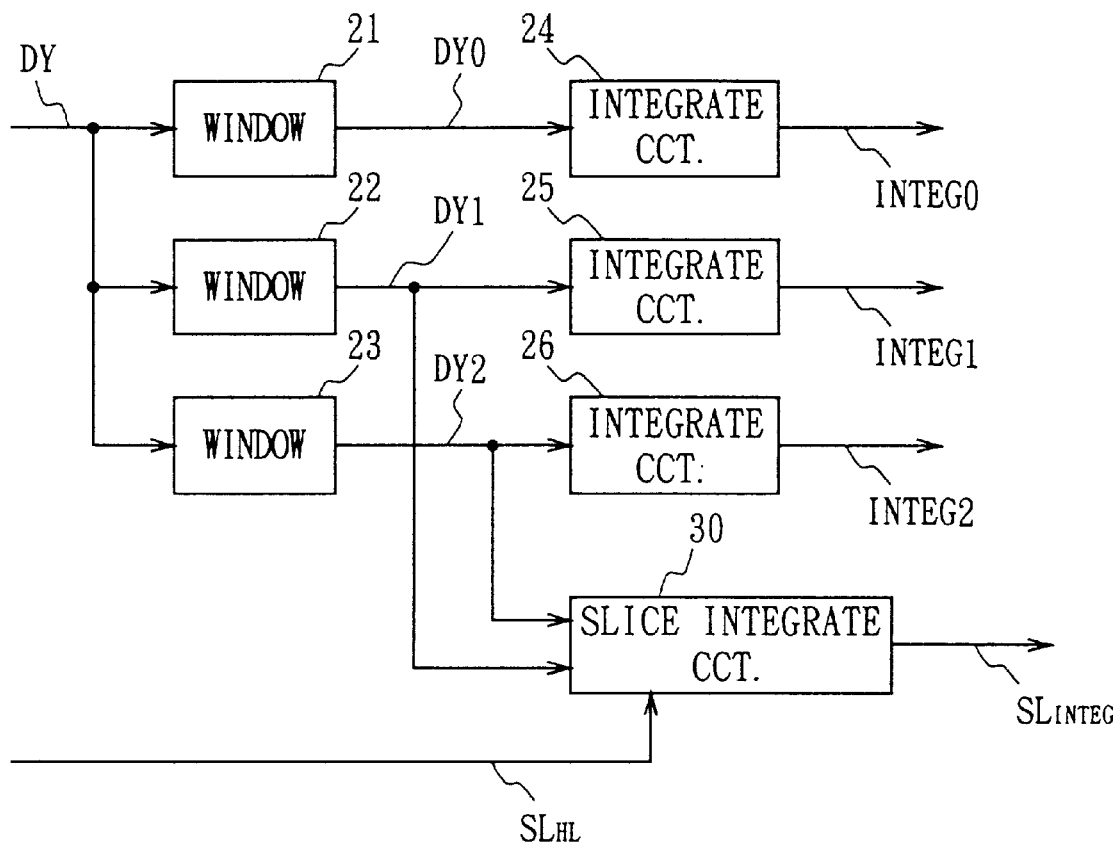
FIG. 4 is a block diagram showing an embodiment of optical detecting circuit.
Figure 5:
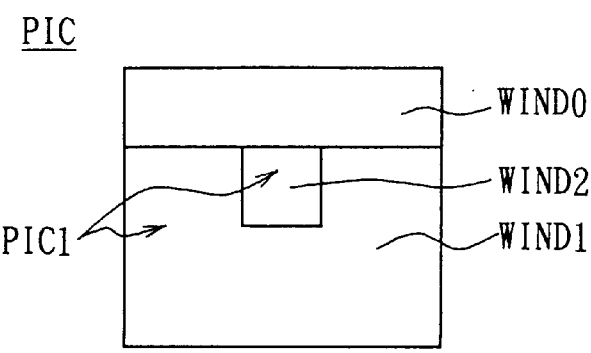
FIG. 5 is a schematic diagram showing the division state of a picture.

FIG. 4 shows the configuration of the optical detecting circuit 20 in which the brightness data DY obtained from the matrix circuit 18 is input to window circuits 21, 22 and 23 respectively. The window circuits 21, 22 and 23 output the respective brightness data DY0, DY1 and DY2 only of each divided areas WIND0, WIND1 and WIND2, these are that a picture PIC has been previously divided into three areas as shown in FIG. 5.

Here, the divided area WIND0 of the picture PIC is an area occupying the upper part of the picture PIC and a subject being a target is not included generally. The divided area WIND1 is the area excepting the center of the picture PIC among the middle part and the lower part of the picture PIC and an area supposed that has a background of a subject mainly. And the divided area WIND2 is an area occupying the center portion of the picture PIC and an area supposed that has a subject mainly. Therefore, the divided areas WIND1 and WIND2 are processed as an effective picture PIC1 when an exposure of the pick-up picture is detected with the less number of pixels (data quantity) that is peculiar to this area.

The window circuit 21 outputs the brightness data DY0 of the divided area WIND0 only to the following integrating circuit 24 to obtain integrated data INTEG0 by integrating. The window circuit 22 outputs the brightness data DY1 of the divided area WIND1 only to the following integrating circuit 25 and a slice integrating circuit 30. The integrating circuit 25 obtains integrated data INTEG1 by integrating the brightness data DY1. And the window circuit 23 outputs the brightness data DY2 of the divided area WIND2 only to the following integrating circuit 26 and the slice integrating circuit 30. The integrating circuit 26 obtains integrated data INTEG2 by integrating the brightness data DY2.

The integrated data INTEG0, INTEG1 and INTEG2 of each divided area WIND0, WIND1 and WIND2 obtained in the integrating circuits 24, 25 and 26 respectively are output to the control unit 19 (FIG. 3). The control unit 19 obtains the integration values of the brightness data of each divided area WIND1 and WIND2 from the integrated data INTEG1 and INTEG2 of the divided areas WIND1 and WIND2. Then the control unit 19 obtains an average brightness level $Y_{AVE}$ of the whole area, two divided areas WIND1 and WIND2 are added, from total integrated values $INTEGE_{ALL}$ which is the total of the integrated values of these two divided areas WIND1 and WIND2 and the total number of pixels $D_{ALL}$ of two divided areas WIND1 and WIND2 by the following equation:

$$Y_{AVE} = \frac{INTEG_{ALL}}{D_{ALL}} \quad (5)$$

This average brightness level $Y_{AVE}$ is calculated by the brightness data DY1 and DY2 in one vertical period of the effective picture PIC1.

Figure 6:
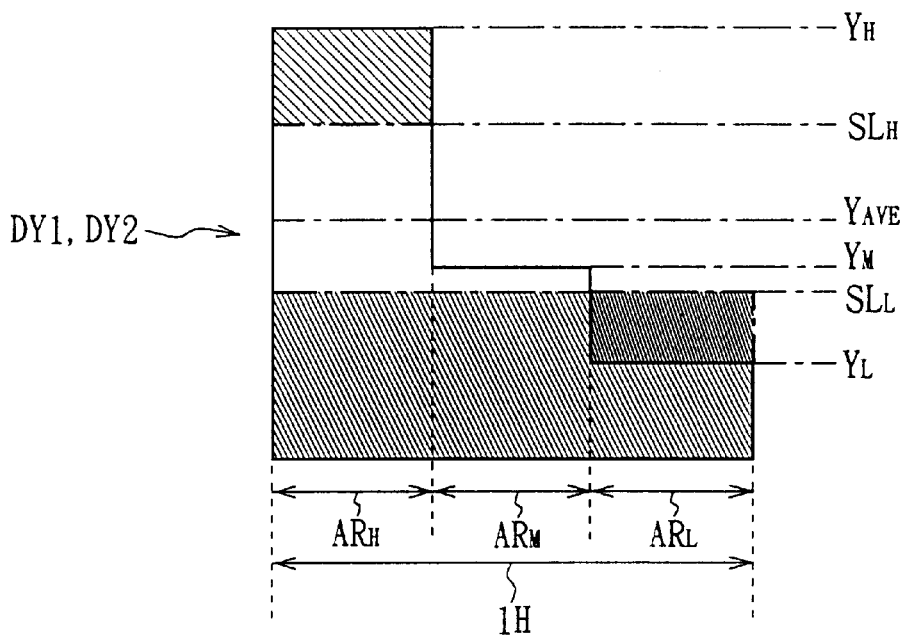
FIG. 6 is a graph explaining calculation of brightness levels.

In this connection, FIG. 6 shows an example of the brightness data DY1 and DY2 of one line (one horizontal period) having a high brightness region $AR_H$, a medium brightness region $AR_M$ and a low brightness region $AR_L$. The control unit 19 calculates the average brightness level $Y_{AVE}$ for the brightness data DY1 and DY2 from Equation (5).

Further, the control unit 19 calculates a slice high level $SL_H$ from this average brightness level YAvW by the following equation:

$$SL_H = \frac{Y_H + Y_{AVE}}{2} \quad (6)$$

Note that, the $Y_H$ is a high brightness setting level set previously and a fixed value. Thus calculated slice high level $SL_H$ becomes a high level when the high brightness setting level is set to a higher level and when the whole average brightness level $Y_{AVE}$ of two divided areas WIND1 and WIND2 of a picture to be imaged becomes high.

Furthermore, the control unit 19 calculates a slice low level $SL_L$ from the average brightness level $Y_{AVE}$ by the following equation:

$$SL_L = \frac{Y_L + Y_{AVE}}{2} \quad (7)$$

Note that, the $Y_L$ is a low brightness setting level set previously and a fixed value. Thus calculated slice low level $SL_L$ becomes a low level when the low brightness setting level is set to a lower level and when the whole average brightness level $Y_{AVE}$ of two divided areas WIND1 and WIND2 of the picture to be imaged becomes low.

By calculating the slice high level SLH and slice low level $SL_L$ based on the brightness of the divided areas WIND1 and WIND2 for one picture as the above, the slice high level $SL_H$ and slice low level $SL_L$ are calculated with the brightness data DY1 and DY2 in one vertical period only.

Figure 7:
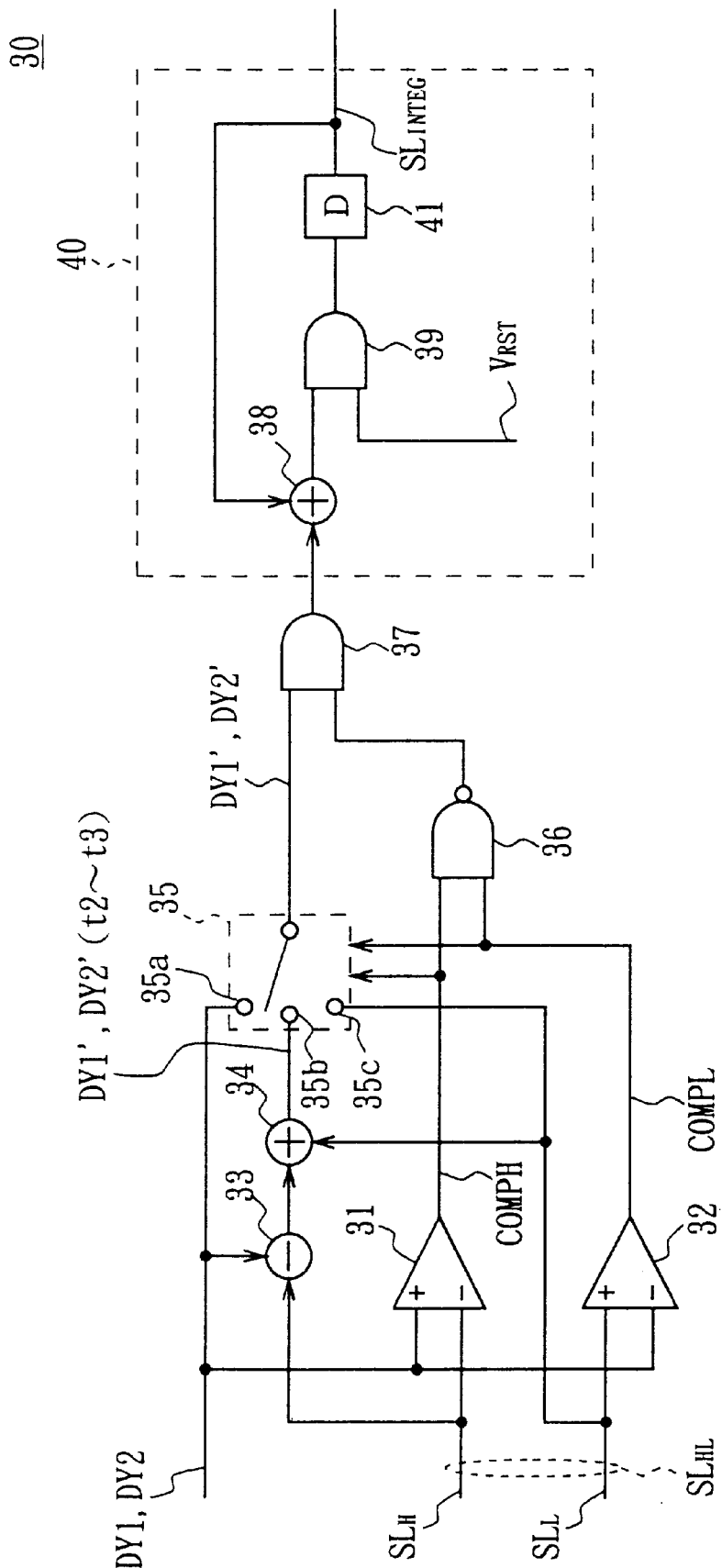
FIG. 7 is a connection diagram illustrating an embodiment of slice integrating circuit.

The slice high level $SL_H$ and slice low level $SL_L$ based on data for one picture, calculated in the control unit 19, are output to the slice integrating circuit 30 of the optical detecting circuit 20 as slice high/low level data $SL_{HL}$. The slice integrating circuit 30 is a circuit for calculating the slice integrated data $SL_{INTEG}$ based on the brightness data DY1 and DY2 which is input from the window circuits 22 and 23 respectively, and the slice high level $SL_H$ and the slice low level $SL_L$ input as the slice high/low level data $SL_{HL}$. As shown in FIG. 7, the brightness data DY1 and DY2 is input to a first switch input terminal 35a of a switching circuit 35, the non-inverted input terminal of a comparing circuit 31 and the inverted input terminal of a comparing circuit 32, respectively.

Figure 8:
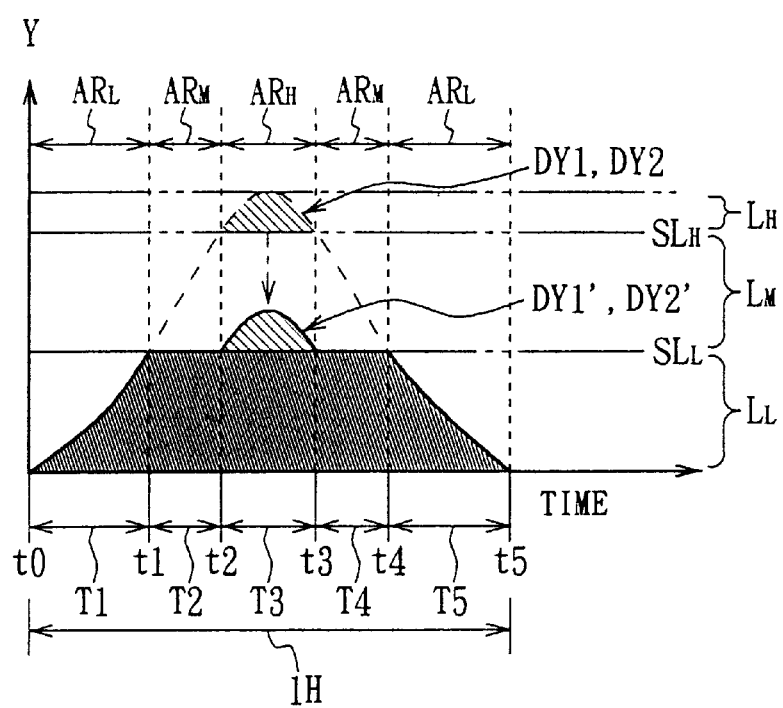
FIG. 8 is a characteristic curvilinear diagram showing an example of brightness data.

The comparing circuit 31 inputs the data of the slice high level $SL_H$ in the data input from the control unit 19 as the slice high/low level data $SL_{HL}$ to the inverted input terminal and compares it with the brightness data DY1 and DY2. In this comparison result, in the case where the slice integration processing is performed with respect to the brightness data DY1 and DY2 as shown in FIG. 8 for example, when the brightness data DY1 and DY2 is larger than the slice high level $SL_H$ as the high brightness region $AR_H$, the comparing circuit 31 raises a comparison output signal COMPH which is output to the first input terminal of a NAND circuit 36 to a logic "H" level, and outputs this comparison output signal COMPH as a switch control signal to the switching circuit 35. If the comparison output signal COMPH is raised to the logic "H" level, the switching circuit 35 switches the input terminal to a second switch input terminal 35b.

The second switch input terminal 35b of the switching circuit 35 inputs an addition result of the difference between the slice high level $SL_H$ obtained in a subtracting circuit 33 and the brightness data DY1 and DY2, and the slice low level $SL_L$. This addition result becomes the data forming the waveform in which the data of the medium brightness level Lm between the slice high level $SL_H$ and the slice low level $SL_L$ (the waveform of brightness data DY1' and DY2') is excepted in FIG. 8. Accordingly, if the brightness data DY1 and DY2 is larger than the slice high level $SL_H$, the brightness data DY1' and DY2' excepted the data of the medium brightness level $L_M$ is input to a first input terminal of an AND circuit 37 through the switching circuit 35.

Accordingly, by the switching circuit 35 is switched based on the comparison output signal COMPH from the comparing circuit 31, the differences between the slice high level $SL_H$ obtained in the subtracting circuit 33 and the brightness data DY1 and DY2 are output from the switching circuit 35 only when the brightness data DY1 and DY2 is larger than the slice high level $SL_H$. Thus an output of the switching circuit 35 during the switch circuit 35 is switched to the switch input terminal 35b becomes slice high integrated data $SL_{INTEGH}$ that slice high integrated data $SL_{INTEGH(I, J)}$ for one pixel of the high brightness region $AR_H$ is integrated. Assuming that the number of pixels of the high brightness region $AR_H$ is $HIST_H$, this slice high integrated data $SL_{IN-TEGH}$ can be represented by the following equation:

$$SL_{INTEGH}=(Y_H-SL_H) \times HIST_H \quad (8)$$

On the other hand, the comparing circuit 32 inputs the data of the slice low level $SL_L$ in the data input from the control unit 19 as the slice high/low level data $SL_{HL}$ to the non-inverted input terminal and compares with the brightness data DY1 and DY2. In this comparison result, when the brightness data DY1 and DY2 is smaller than the slice low level $SL_L$ as the low brightness region $AR_L$ shown in FIG. 8 for example, the comparing circuit 32 raises a comparison output signal COMPL which is output to the second input terminal of the NAND circuit 36 to the logic "H" level, and outputs this comparison output signal COMPL as a switch control signal to the switching circuit 35. If the comparison output signal COMPL is raised to the logic "H" level, the switching circuit 35 switches the input terminal to the first input terminal 35a.

The first switch input terminal 35a of the switching circuit 35 is an input terminal for inputting the brightness data DY1 and DY2 as it is. If the brightness data DY1 and DY2 is smaller than the slice low level $SL_L$ like the brightness data DY1 and DY2 in a period T1 between time points t0–t1 and T5 between t4–t5 in FIG. 8, the brightness data DY1 and DY2 is input to the first input terminal of the AND circuit 37 via the switching circuit 35 as it is.

On the other hand, if the values of brightness data DY1 and DY2 are between the slice high level $SL_H$ and the slice low level $SL_L$ like the brightness data DY1 and DY2 in a period T2 between time points t1–t2 and T4 between t3–t4 in FIG. 8, both the comparison output signal COMPH output from the comparing circuit 31 and the comparison output signal COMPL output from the comparing circuit 32 are lowered to a logic "L" level. In this state, the switching circuit 35 shifts to a third switch input terminal 35c and inputs the data of the slice low level $SL_L$ only to the first input terminal of the AND circuit 37.

Therefore, to the first input terminal of the AND circuit 37, when the values of the brightness data DY1 and DY2 are smaller than the slice low level $SL_L$ (periods T1 and T5), this brightness data is input as it is, and when the values of that are between the slice high level $SL_H$ and the slice low level $SL_L$ (periods T2 and T4), the portion larger than the slice low level $SL_L$ in the values of brightness data DY1 and DY2 is cut off and the data of the slice low level $SL_L$ only is input, and when the values of that are larger than the slice high level $SL_H$ (period T), the data between the slice high level $SL_H$ and the slice low level $SL_L$ in the values of the brightness data DY1 and DY2 is cut off and the brightness data of the low brightness level $L_L$ and the high brightness level $L_H$ only is input as the brightness data DY1' and DY2' (FIG. 8).

In this connection, in the brightness data DY1' and DY2' input to the first input terminal of the AND circuit 37, assuming that the data which is integrated the data smaller than the slice low level $SL_L$ of pixels for one picture is slice low integrated data $SL_{INTEGL}$, this slice low integrated data $SL_{INTEGL}$ can be represented by the following equation:

$$SL_{INTEGL}=SL_L \times D_{ALL}-(SL_L-Y_L) \times HIST_L \quad (9)$$

In this Equation (9), the $D_{ALL}$ represents the total number of pixels of one picture, HISTL the number of pixels of the low brightness region $AR_L$, and $Y_L$ the low brightness setting level. That is, this slice low integrated data $SL_{INTEGL}$ becomes data including the number of pixels of the low brightness region $AR_L$.

On the other hand, to the second input terminal of the AND circuit 37, an output of the NAND circuit 36 is given. The output of the NAND circuit 36 becomes the logic "L" level in the abnormal state only where the brightness data DY1 and DY2 is larger than the slice high level $SL_H$ and smaller than the slice low level. Accordingly, when the circuit operates normally, the logic "H" level is always input to the second input terminal of the NAND circuit 37. Thereby, the brightness data DY1 and DY2 (or DY1' and DY2') output from the switching circuit 35 is always output to an adding circuit 38 of a circulate adding circuit unit 40 which follows the output terminal of the AND circuit 37.

The adding circuit 38 adds the slice integrated data $SL_{INTEG}$ fed back from a latch circuit 41 to an output of the AND circuit 37 and inputs this addition result to the first input terminal of an AND circuit 39. The AND circuit 39 receives a vertical reset pulse signal $V_{RST}$ which synchronizes with a vertical synchronizing signal for each one vertical period and lowers to the logic "L" level at the second input terminal. Therefore, the AND circuit 39 stops outputting an output of the adding circuit 38 to the latch circuit 41 during the vertical reset pulse signal $V_{RST}$ is lowered to the logic "L" level, and outputs the output of the adding circuit 38 to the latch circuit 41 during the vertical reset pulse signal $V_{RST}$ is raised to the logic "H" level (one vertical period).

As a result, the latch circuit 41 latches and outputs the output of the adding circuit 38 while reset for one vertical period. Thus an output of the latch circuit 41 is fed back to the adding circuit 38 so as to be the slice integrated data $SL_{INTEG}$ that is integrated the values of the brightness data DY1' and DY2' by one vertical period. Therefore, the slice integrated data $SL_{INTEG}$ at the time point of the end of one vertical period becomes the value that the area of the low brightness level $L_L$ and the high brightness level $L_H$ surrounded with the brightness data DY1' and DY2' shown in FIG. 8 is integrated by one vertical period.

Thus calculated slice integrated data $SL_{INTEG}$ is output to the control unit 19 (FIG. 3). This slice integrated data $SL_{INTEG}$ includes the number of pixels (area) of the low brightness region $AR_L$ as described above with reference to Equation (9). The control unit 19 calculates the number of pixels (area) of the low brightness region $AR_L$ from the slice integrated data $SL_{INTEG}$. That is, the control unit 19 calculates the number of pixels of low brightness region $HIST_L$ by means of the slice integrated data $SL_{INTEG}$, slice high integrated data $SL_{INTEGH}$, slice low level $SL_L$, total number of pixels of one picture $D_{ALL}$, and low brightness setting level $Y_L$ by the following equation:

$$HIST_L = \frac{SL_{INTEGH} + SL_L \times D_{ALL} - SL_{INTEG}}{SL_L - Y_L} \quad (10)$$

The control unit 19 calculates the number of pixels (area) of the medium brightness region ARM by means of the number of pixels of low brightness region HISTL by the following equation:

$$HIST_M=D_{ALL}-HIST_H-HIST_L \quad (11)$$

Here, an area having medium brightness in one picture almost equals to a subject area, thus this number of pixels of medium brightness region $HIST_M$ becomes almost equal to the area of a subject.

Further, the control unit 19 calculates a medium brightness level $Y_M$ in one picture by means of the number of pixels of medium brightness region HISTH by the following equation:

$$Y_M = \frac{INTEG_{ALL} - Y_H \times HIST_H - Y_L \times HIST_L}{HIST_M} \qquad (12)$$

Here, an area having medium brightness in one picture almost equals to a subject area, thus this medium brightness level $Y_M$ becomes almost equal to the brightness of a subject.

Figure 9:
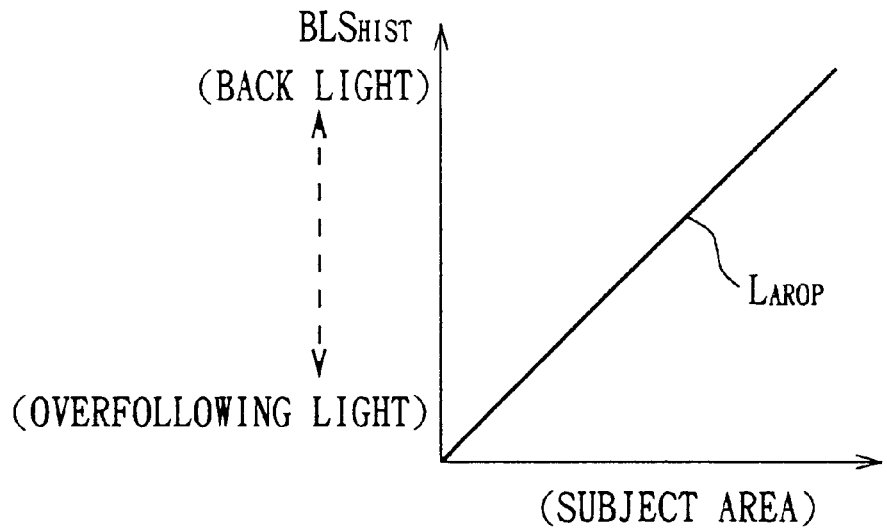
FIG. 9 is a characteristic curvilinear diagram showing the relation between a subject area and a light source position.
Figure 10:
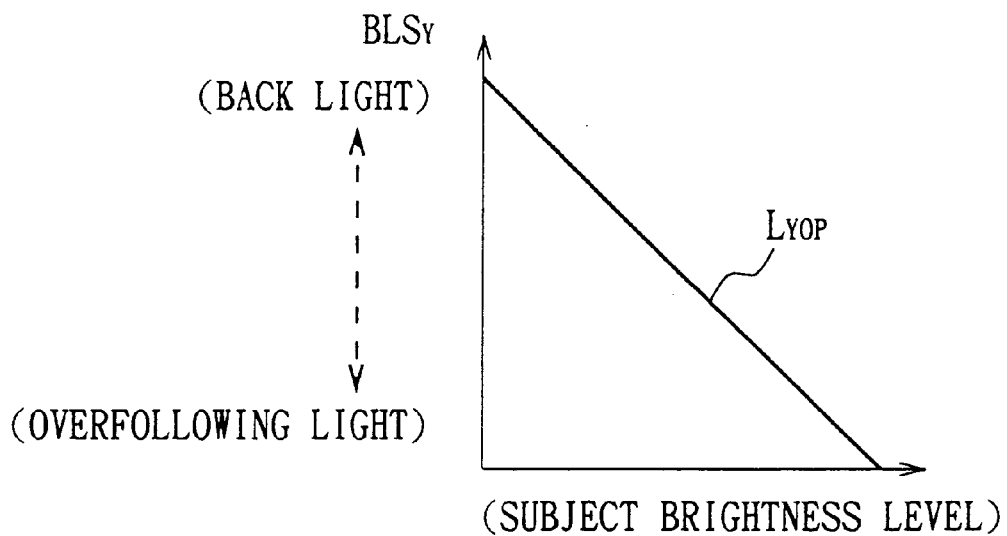
FIG. 10 is a characteristic curvilinear diagram showing the relation between a subject brightness and the light source position.

In the above manner, the area and brightness of a subject can be calculated from Equations (11) and (12). Here, as shown in FIG. 9, in the relation between the area of a subject (medium brightness region $AR_M$) and a back light state $BLS_{HIST}$, estimated by the subject area (subject area–back light state curve $L_{AROP}$), the back light state $BLS_{HIST}$ becomes larger as the subject area is larger (it is in a strong back light state). On the other hand, as shown in FIG. 10, in the relation between the brightness level of a subject (medium brightness region $AR_M$) and a back light state $BLS_Y$ estimated by the brightness level of subject (brightness level of subject–back light state curve $L_{YOP}$), the back light state $BLS_Y$ becomes larger as the brightness level of subject is low (it is in a strong back light state).

Further, it is presumed that the state of back light state (back light state) is strong as the area of subject $HIST_M$ is large and the brightness of subject $Y_M$ is small. For this reason, the back light state BLS of a pick-up picture estimated by two back light states $BLS_{HIST}$ and $BLS_Y$ can be represented by means of the area of subject HISTM (the area of medium brightness region $AR_M$) and the brightness of subject $Y_M$ (the brightness level of medium brightness region $AR_M$) by the following equation:

$$BLS = HISTM \times Y_M \qquad (13)$$

Figure 11:
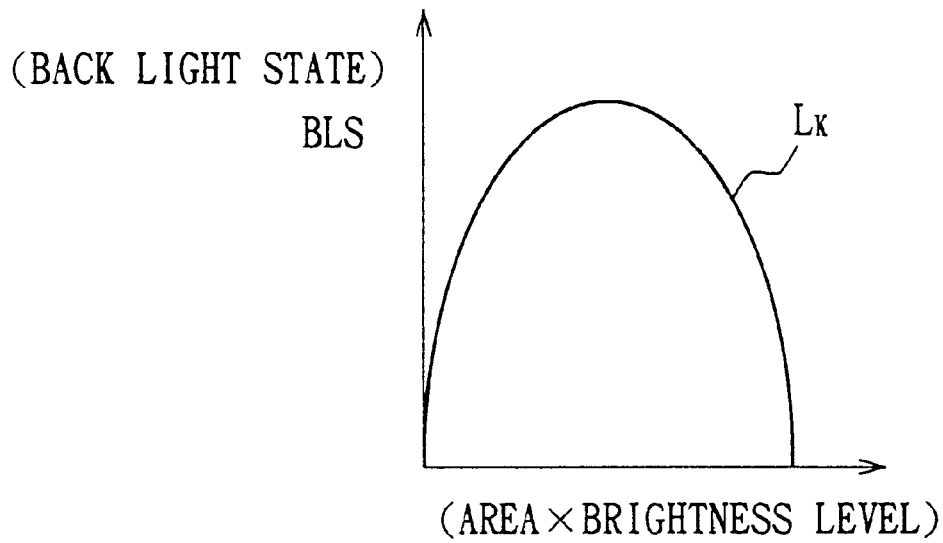
FIG. 11 is a characteristic curvilinear diagram illustrating a back light state curve.
Figure 19:
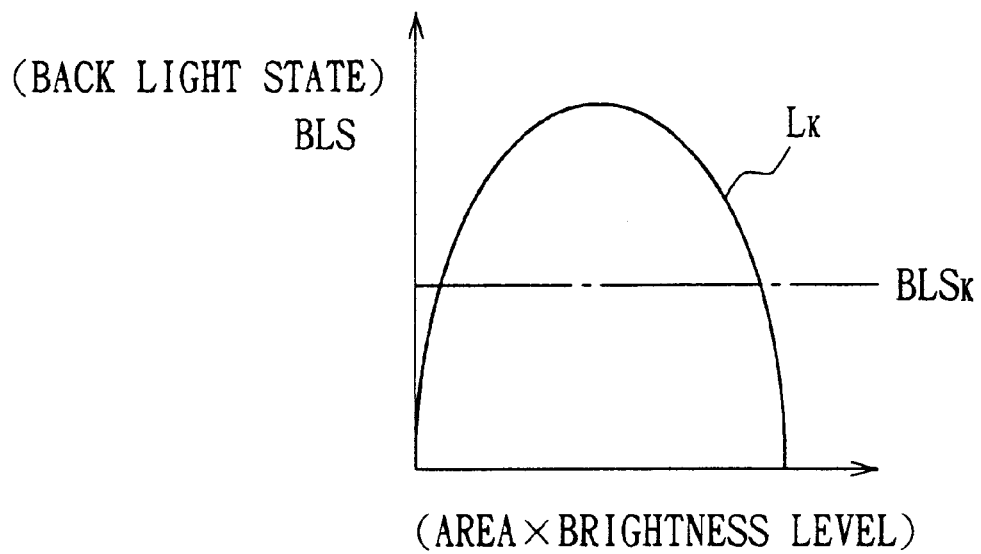
FIG. 19 is a characteristic curvilinear diagram illustrating the other embodiment.

This relation is a back light state curve $L_K$ shown in FIG. 11.

The control unit 19 calculates the back light state BLS with respect to one picture (i.e., one vertical period) to obtain a correction quantity K in relation to this back light state BLS. The correction quantity K is added to the brightness control signals CONT1, CONT2 and CONT3 which are output from the control unit 19 to each brightness adjusting means (the diaphragm 11, solid imaging device 12 and automatic gain control circuit 13) so as to be the correction quantity K as a whole. Accordingly, the reference value $AE_{REF}$ varies by the correction quantity K as the whole of each brightness adjusting means (the diaphragm 11, solid imaging device 12 and automatic gain control circuit 13) for controlling exposure so that the average brightness level $Y_{AVE}$ in the whole picture becomes the reference value $AE_{REF}$ being a target by the brightness control signals CONT1, CONT2 and CONT3.

Thereby, assuming the reference value as $AE_{REF}$, the brightness level $Y_{ACTAE}$ of a pick-up signal S13 output from the automatic gain control circuit 13 becomes as the following equation:

$$Y_{ACTAE} = AE_{REF} + K \qquad (14)$$

And back light correction (brightness correction) corresponding to the back light state BLS is performed on automatic exposure using the diaphragm 11, solid imaging device 12 and automatic gain control circuit 13 by the control unit 19.

Figure 12:
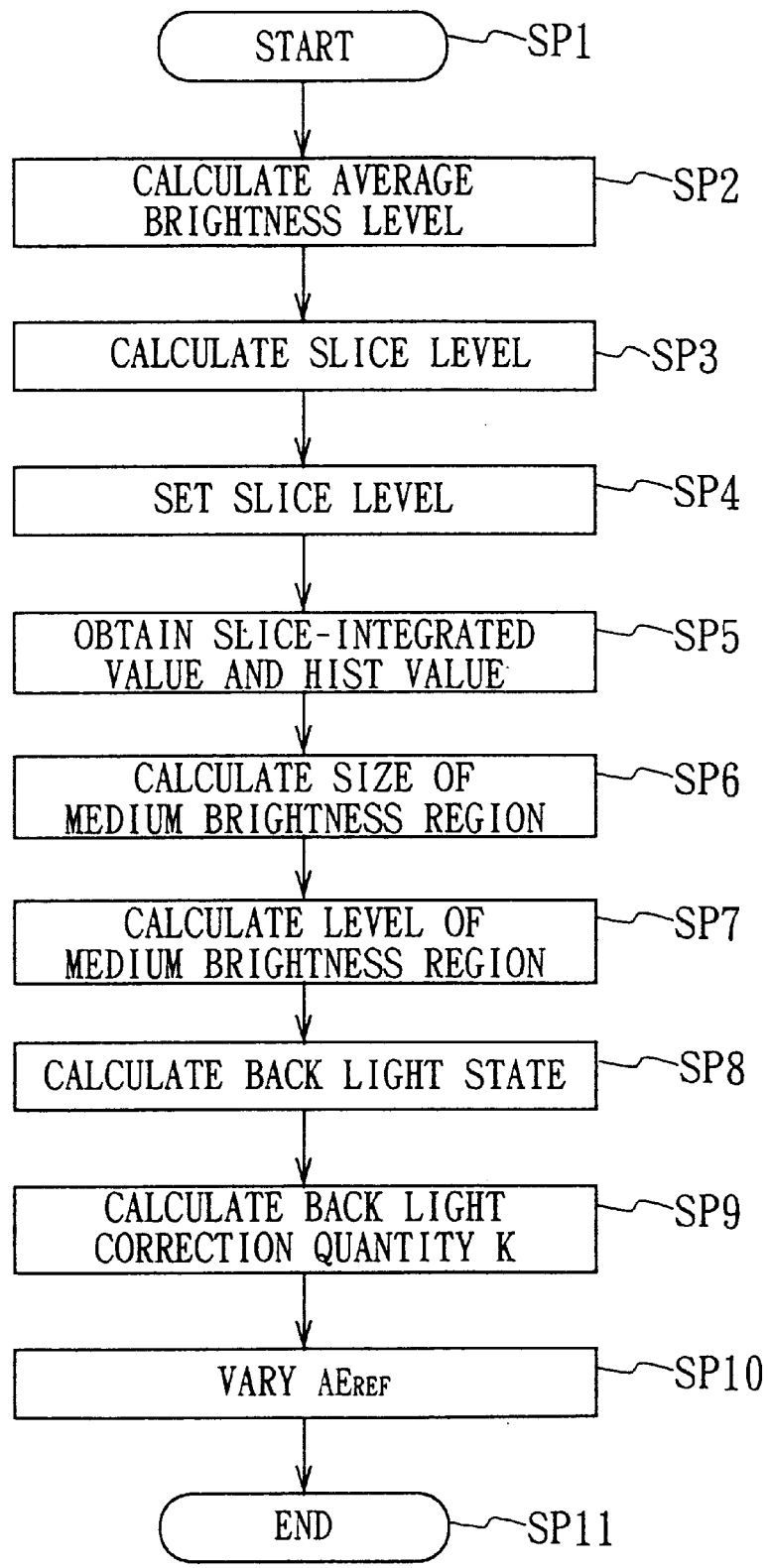
FIG. 12 is a flowchart showing a back light correcting process.

In this connection, FIG. 12 shows a back light correcting process by the control unit 19. The control unit 19 starts the back light correcting process from step SP1, in step SP2, calculates the average brightness level $Y_{AVE}$ of the entire picture from all of the brightness integrated values of one picture processing now, and in the following step SP3, calculates the slice high level $SL_H$ and slice low level $SL_L$ which will be used in the processing of the following one picture from the average brightness level $Y_{AVE}$.

Then in step SP4, the control unit 19 outputs the slice high level $SL_H$ and slice low level $SL_L$ calculated at the above timing to the optical detecting circuit 20 so that the slice high level $SL_H$ and slice low level $SL_L$ are set in the optical detecting circuit 20. The optical detecting circuit 20 calculates the slice integrated value $SL_{INTEG}$ of the following one picture (one vertical period) by means of the set slice high level $SL_H$ and slice low level $SL_L$ and outputs it to the control unit 19.

In step SP5, the control unit 19 obtains the slice integrated value $SL_{INTEG}$ from the optical detecting circuit 20 and the number of pixels $HIST_H$ of the high brightness region $AR_H$, in step SP6, calculates the number of pixels (area) of the medium brightness region $AR_M$ based on that data, and in the following step SP7, calculates the brightness level $Y_M$ of the medium brightness region $AR_M$.

Based on thus calculated area $HIST_H$ and brightness level $Y_M$ of the medium brightness region $AR_M$, in step SP8, the control unit 19 calculates the back light state BLS, and in step SP9, calculates the back light correction quantity K from the back light state BLS. Then in step SP10, the control unit 19 adds the back light correction quantity K to the reference value $AE_{REF}$ of the brightness of picture to vary the reference value $AE_{REF}$, and in step SP11, finishes the above process.

According to the above, the slice high level $SL_H$ and slice low level $SL_L$ for the next one picture are calculated from all of the brightness integrated values of one picture, and the back light correction quantity K is calculated from this data to vary the reference value $AE_{REF}$. Thereby, the slice integrated data $SL_{INTEG}$ necessary for calculating the back light correction quantity K can be obtained in one vertical period.

Figure 13:
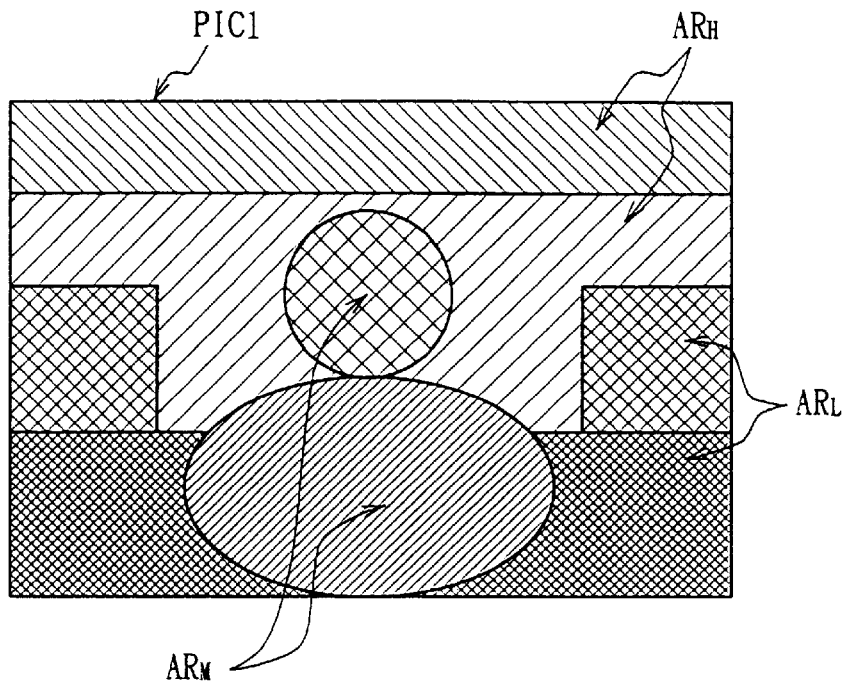
FIG. 13 is a schematic diagram showing a brightness distribution of a pick-up picture.

According to the above configuration, when the brightness distribution of an image in the effective picture PIC1 is in the state shown in FIG. 13, the control unit 19 detects the slice high level $SL_H$ and slice low level $SL_L$ by means of the average brightness level $Y_{AVE}$ in the whole effective picture PIC1 obtained in one vertical period in the optical detecting circuit 20.

Figure 14:
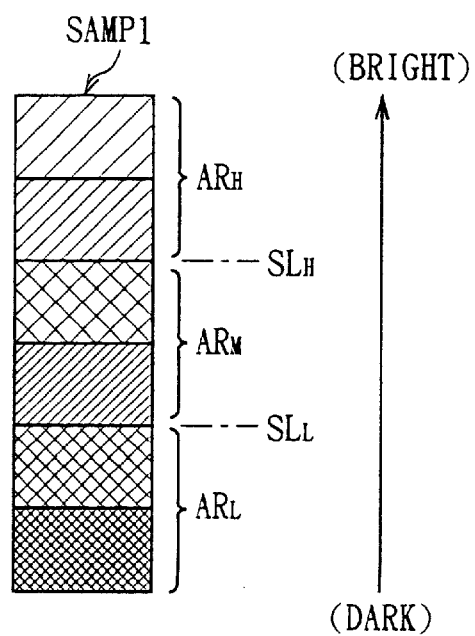
FIG. 14 is a schematic diagram showing a brightness sample in the pick-up picture.

FIG. 14 shows a brightness sample SAMP1 that brightness of the pick-up picture of FIG. 13 is sampled for each predetermined brightness level, and divided into the high brightness region $AR_H$, medium brightness region $AR_M$ and low brightness region $AR_L$ according to the slice high level $SL_H$ and slice low level $SL_L$.

Figure 15:
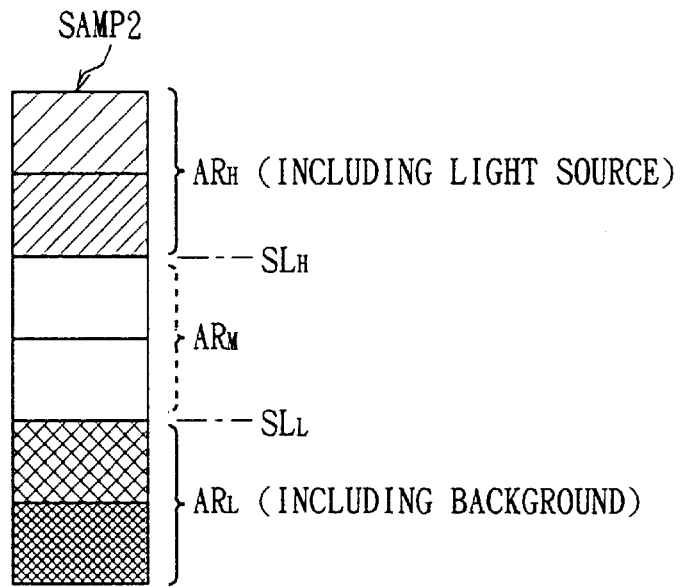
FIG. 15 is a schematic diagram explaining the extraction state of a high brightness level and a low brightness level.
Figure 16:
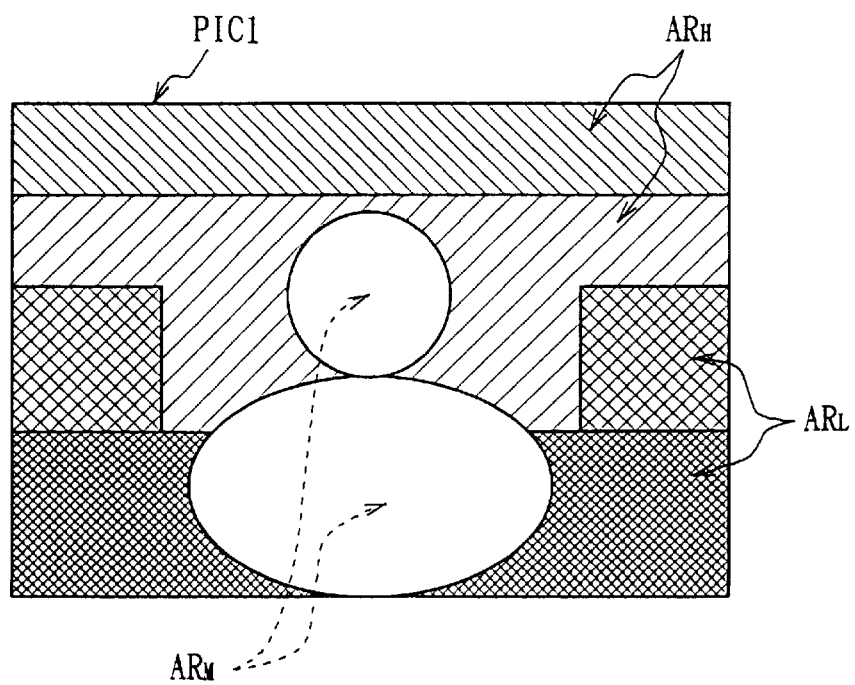
FIG. 16 is a schematic diagram illustrating the calculation state of a high brightness region and a low brightness region by slice integration.
Figure 17:
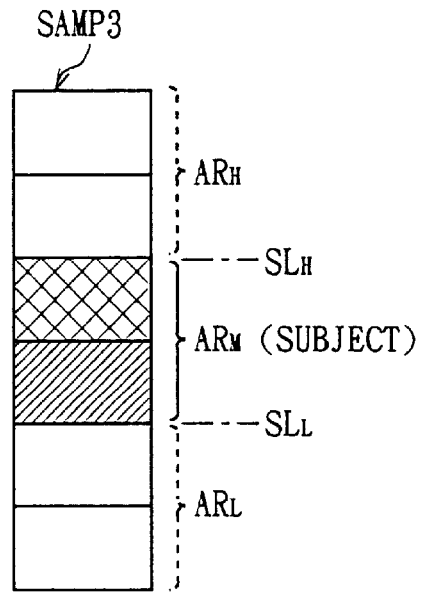
FIG. 17 is a schematic diagram explaining extraction of a medium brightness region.

A slice integrating circuit 30 of the optical detecting circuit 20 performs slice integration on the above pick-up picture so that the high brightness region $AR_H$ and low brightness region $AR_L$ only are extracted as shown in a brightness sample SAMP2 of FIG. 15. The high brightness region $AR_H$ is a region including the light source having a larger brightness level than the slice high level $SL_H$, as shown in FIG. 16, and the low brightness region $AR_L$ is a region including a background having a smaller brightness level than the slice low level $SL_L$.

The control unit 19 obtains the medium brightness region $AR_M$ only as shown in a brightness sample SAMP3 of FIG.

Figure 18:
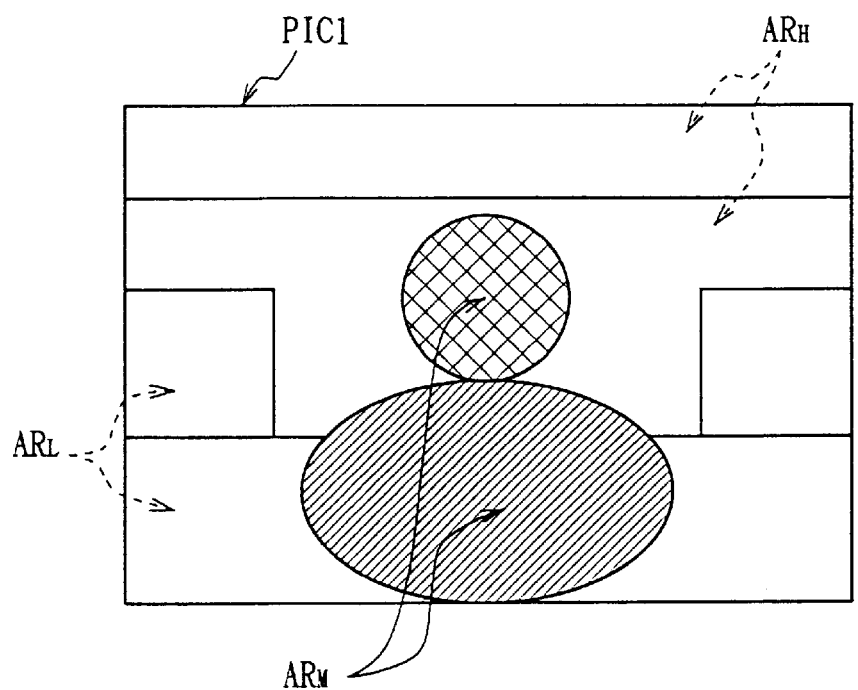
FIG. 18 is a schematic diagram showing the calculation state of an area and a brightness level of a subject area.

17 by means of thus extracted high brightness region $AR_H$ and low brightness region $AR_L$. The medium brightness region $AR_M$ is a region including a subject image having the brightness level between the slice high level $SL_H$ and the slice low level $SL_L$ as shown in FIG. 18.

As the above, the slice high level $SL_H$ and slice low level $SL_L$ are calculated by means of the average brightness level $Y_{AVE}$ in the whole pick-up picture, and the medium brightness region $AR_M$ including a subject image is extracted by means of the slice high level $SL_H$ and the slice low level $SL_L$, thereby, the medium brightness region $AR_M$ based on the brightness of the entire picture can be always obtained. Thus obtained medium brightness region $AR_M$ becomes a brightness region including a subject image. By extracting the medium brightness region $AR_M$, the subject image can be discriminated from the low brightness region $AR_L$ including the background.

Accordingly, the brightness level (the medium brightness level $Y_M$) of the medium brightness region $AR_M$ which consists of almost the subject image only without including the background is calculated. Thereby, almost the brightness level (the medium brightness level $Y_M$) only can be calculated correctly comparing with the case where the brightness level of the subject including the low brightness region $AR_L$ being the background is calculated, or the case where the brightness level of the subject is obtained by calculating the average brightness level of all of the brightness regions including the low brightness region and high brightness region.

If thus calculated value of the medium brightness level $Y_M$ of the medium brightness region $AR_M$ is large, this means that the picture is in a following light state. On the other hand, if the value of the medium brightness level $Y_M$ is small, this means that the picture is in a back light state. In addition, the back light state changes like that as the value of the medium brightness level $Y_M$ becomes large, the back light state becomes small almost in inversely proportion to that (FIG. 10).

Also, if the value of the number of pixels (area) of the medium brightness region $AR_M$, $HIST_H$ is small, this means that the picture is in a following light state. On the other hand, if the value of the number of pixels $HIST_M$ is large, this means that the picture is in a back light state. In addition, the back light state changes like that as the area of the medium brightness region $AR_M$ becomes large, the back light state becomes large almost in proportion to that (FIG. 9).

Further, it is presumed that the state of back light state is strong (the back light state is large) as the area of the medium brightness region $AR_M$ is large and the brightness level $Y_M$ of the medium brightness region $AR_M$ is small. For this reason, the control unit 19 obtains the back light state BLS (FIG. 11) based on both the areas ($HIST_M$) of the medium brightness level $Y_M$ and the medium brightness region $AR_M$ by the integration result of the areas ($HIST_M$) of the medium brightness level $Y_M$ and the medium brightness region $AR_M$ and detects the correction quantity K based on that.

When the value of the back light state BLS is large, the control unit 19 controls the correction quantity K in accordance with that to greatly vary the reference value $AE_{REF}$ being the target of the brightness of a picture, so that overexposure and insufficient exposure of a subject by automatic exposure control corresponding to the whole picture can be prevented. Furthermore, the control unit 19 controls the reference value being the target of the brightness of a picture so as to be close to (or coincide with) the reference value $AE_{REF}$, thereby, an exposure by automatic exposure control corresponding to the whole picture can be obtained.

Accordingly, in the case where the rate of a subject area to the whole picture is small and the brightness level of subject is large, the back light state BLS becomes small; thus the correction quantity K becomes small. That is, in the case where the rate of a subject area to the whole picture is small, an exposure can be adjusted in the main of the whole picture excepting the subject, and the portion other than the subject such as a background and a light source is imaged with a suitable exposure. As a result, a natural image for viewer can be obtained.

Furthermore, in the case where the rate of a subject area to the whole picture is large and the brightness level of subject is small, the correction quantity K becomes large because the back light state BLS becomes large. That is, in the case where the brightness level of a subject is small, even if the subject area is large, the subject portion is imaged with a suitable exposure by detecting that the subject is in a back light state. As a result, a natural image for viewer can be obtained.

According to the above configuration, the medium brightness region $AR_M$ is extracted by means of the slice high level $SL_H$ and slice low level $SL_L$ obtained based on the average brightness level $Y_{AVE}$, and the back light state BLS of a pick-up picture is detected from the area of the medium brightness region $HIST_M$ and the brightness level (medium brightness level) $Y_M$ of the medium brightness region $AR_M$, so that detection of the back light state suitable to a light state of a subject can be performed comparing with the conventional case for correcting a back light state in which a subject and a background are set as a low brightness region collectively. As a result, optimal back light correction for subject can be performed.

Moreover, since the back light state BLS can be detected based on the brightness data of one picture (for one vertical period) so that processing time can be shortened comparing with the conventional case.

Note that, in the aforementioned embodiment, it has been described in the case where the correction quantity K which is almost in proportion to the back light state BLS (FIG. 11). This invention, however, is not limited to this but also back light correction that assuming a predetermined back light state $BLS_K$ as a threshold value with respect to a back light state curve $L_R$, only when the calculated back light state exceeds the threshold value $BLS_K$, the control unit 19 adds the correction quantity K being in proportion to a predetermined correction quantity K or the back light state BLS to the reference value AERF for exposure may be performed.

In the aforementioned embodiments, it has been described in the case where the picture PIC (FIG. 5) is divided into three division area, and a back light state BLS for back light correction is calculated in that two division areas WIND1 AND WIND2 are set to the effective area PIC1. This invention, however, is not limited to this but also may calculate the back light state BLS by using the entire picture or by finely dividing a picture into the other various kinds of areas while using a predetermined division area at need.

In the aforementioned embodiments, it has been described in the case where an exposure is controlled by means of the diaphragm 11, solid imaging device 12 and automatic gain control circuit 13. This invention, however, is not limited to this but also may use any one of those exposure control means (11, 12 and 13).

In the aforementioned embodiments, it has been described in the case where the slice high level $SL_H$ and slice low level $SL_L$ are calculated based on the average brightness level $Y_{AVE}$ of the effective picture PIC1. This invention, however, is not limited to this but also may set the slice high level $SL_H$ and slice low level $SL_L$ as fixed values.

Further, in the aforementioned embodiments, it has been described in the case where back light correction is performed using the correction quantity K almost being in proportion to the back light state curve $L_K$. This invention, however, is not limited to this but also may set a correction quantity which varies gradually corresponding to the back light state BLS.

Furthermore, in the aforementioned embodiments, it has been described in the case where the back light state BLS is calculated from the area $HIST_M$ and the medium brightness level $Y_M$ of the medium brightness region $AR_M$. This invention, however, is not limited to this but also may detect the back light state based on any one of the area $HIST_M$ and the medium brightness level $Y_M$ or the medium brightness region $AR_M$.

As described above, according to this invention, concerning pixels other than the pixels which has the brightness level between two slice levels given from the outside, its brightness level is integrated to distinguish a subject area from a background area. A back light state is estimated from the area and/or brightness level of the subject area. Thereby the back light state can be detected more correctly.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An image pick-up apparatus comprising:

image pick-up means for imaging an optical image from a subject and generating a pick-up signal;

medium brightness area detecting means for detecting an area of a medium brightness level area, which has a brightness level between a first brightness level and a second brightness level higher than said first brightness level, in a picture formed by said pick-up signal;

average brightness level of medium brightness region detecting means for detecting an average brightness level of the pick-up signal included in said medium brightness level area; and back light state detecting means for detecting a back light state showing whether the subject is imaged or not in a back light state on the basis of both said area of the medium brightness level area and said average brightness level.

2. The image pick-up apparatus according to claim 1, wherein said back light state detecting means detects that a back light state is large as said area of the medium brightness level area is larger and said average brightness level is smaller.

3. The image pick-up apparatus according to claim 1, further including iris control means for controlling an iris in accordance with said back light state.

4. The image pick-up apparatus according to claim 3, wherein said iris control means controls said iris by a value proportional to said back light state.

5. The image pick-up apparatus according to claim 1, further including:

average brightness level of total picture detecting means for detecting an average brightness level of the total picture of a pick-up signal for one picture of said pick-up signal; and brightness level setting means for setting said first and second brightness levels on the basis of said average brightness level of total picture.

6. A back light detecting method for detecting whether a subject is imaged or not in a back light state on the basis of a pick-up signal, comprising the steps of:

detecting an area of a medium brightness level area, which has a brightness level between a first brightness level and a second brightness level higher than said first brightness level, in a picture formed by said pick-up signal;

detecting an average brightness level of the pick-up signal included in said medium brightness level area; and detecting a back light state showing whether the subject is imaged or not in a back light state on the basis of both said area of the medium brightness level area and said average brightness level.

7. The back light detecting method according to claim 6, wherein in said step of detecting said back light state, it is detected that a back light state is large as said area of the medium brightness level area is larger and said average brightness level is smaller.

8. The back light detecting method according to claim 6, further including the steps of:

detecting an average brightness level of the total picture of a pick-up signal for one picture of said pick-up signal; and setting said first and second brightness levels on the basis of said average brightness level of total picture.

* * * * *